US012639362B2

(12) United States Patent
Yi et al.

(10) Patent No.: US 12,639,362 B2
(45) Date of Patent: May 26, 2026

(54) LOCATION OF KEY VALUE PAIRS

(71) Applicant: INTERNATIONAL BUSINESS MACHINES CORPORATION, Armonk, NY (US)

(72) Inventors: Ang Yi, Beijing (CN); Jing Zhang, Beijing (CN); Hai Cheng Wang, Beijing (CN); Jun Hong Zhao, Beijing (CN); Hong Lin G Guo, Beijing (CN); Dong Rui Li, Beijing (CN); Yang Zhong Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 18/739,916

(22) Filed: Jun. 11, 2024

(65) Prior Publication Data

US 2025/0378109 A1 Dec. 11, 2025

(51) Int. Cl.
| | |
|---|---|
| *G06F 16/00* | (2019.01) |
| *G06F 16/383* | (2019.01) |
| *G06V 30/412* | (2022.01) |

(52) U.S. Cl.
CPC .......... *G06F 16/383* (2019.01); *G06V 30/412* (2022.01)

(58) Field of Classification Search
CPC .................................................... G06F 16/383
See application file for complete search history.

(56) References Cited

U.S. PATENT DOCUMENTS

| | | | |
|---|---|---|---|
| 10,452,904 | B2 | 10/2019 | Northrup et al. |
| 10,867,171 | B1 | 12/2020 | Contryman et al. |
| 11,699,297 | B2 | 7/2023 | Gao et al. |
| 11,804,057 | B1 | 10/2023 | Toffey et al. |
| 2023/0419710 | A1 | 12/2023 | Goyal et al. |
| 2025/0053746 | A1* | 2/2025 | Li ......................... G06F 40/166 |

FOREIGN PATENT DOCUMENTS

CN 115878813 A 3/2023

OTHER PUBLICATIONS

Hong, Teakyu et al. "BROS: A Pre-trained Language Model Focusing on Text and Layout for Better Key Information Extraction from Documents" arXiv https://arxiv.org/pdf/2108.04539.pdf Apr. 5, 2022.
Garncarek, Lukasz et al. "LAMBERT: Layout-Aware Language Modeling for Information Extraction." arXiv https://arxiv.org/pdf/2002.08087.pdf May 28, 2021.
Arora, Simran et al. "Language Models Enable Simple Systems for Generating Structured Views of Heterogeneous Data Lakes." arXiv https://arxiv.org/pdf/2304.09433.pdf Apr. 20, 2023.

(Continued)

*Primary Examiner* — Ajith Jacob
(74) *Attorney, Agent, or Firm* — Lily Neff, Esq.; Rachel L. Pearlman, Esq.; Heslin Rothenberg Farley & Mesiti P.C.

(57) ABSTRACT

Computer implemented methods, systems, and computer program products include program code executing on a processor(s) extract formerly missing KVP from fields in a document. The program code utilizes an extractor to monitor KVP data in a document. Based on the monitoring, the program code determines that accuracy of a field in the document, is below a pre-defined threshold. The program code dynamically generates a new extractor comprising a KVP extractor to target the field in the document.

18 Claims, 8 Drawing Sheets

(56)                 References Cited

OTHER PUBLICATIONS

IBM Automation Document Processing, Retrieved from: https://web.archive.org/web/20231130112731/https://www.ibm.com/products/document-processing, Nov. 30, 2023, 9 pages.

Verberne, et al., Evaluation And Analysis of Term Scoring Methods For Term Extraction, Information Retrieval Journal, vol. 19, Aug. 10, 2016, pp. 510-545.

\* cited by examiner

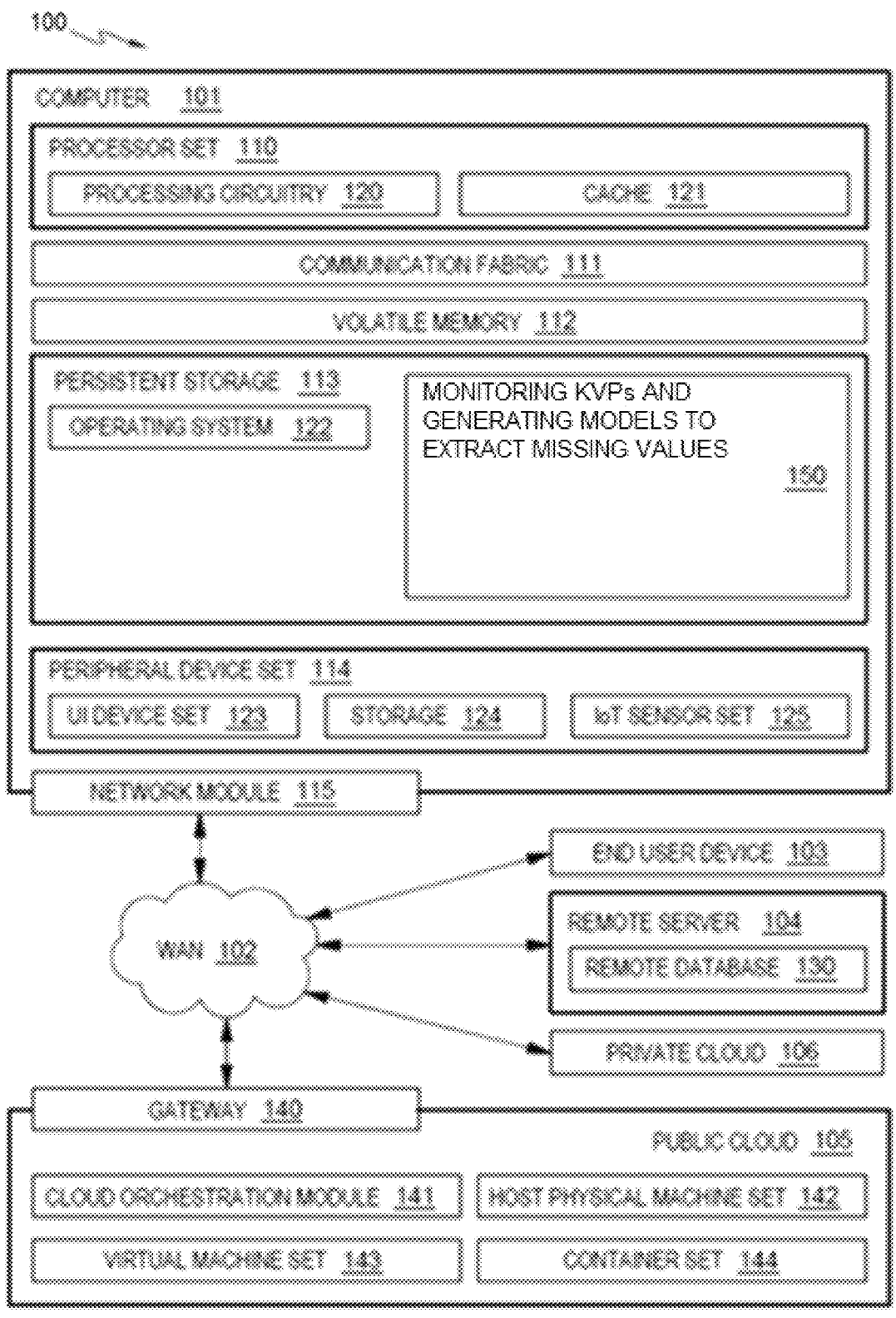

COMPUTER 101

PROCESSOR SET 110

PROCESSING CIRCUITRY 120 CACHE 121

COMMUNICATION FABRIC 111

VOLATILE MEMORY 112

PERSISTENT STORAGE 113

OPERATING SYSTEM 122

MONITORING KVPs AND GENERATING MODELS TO EXTRACT MISSING VALUES

150

PERIPHERAL DEVICE SET 114

UI DEVICE SET 123 STORAGE 124 IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141 HOST PHYSICAL MACHINE SET 142

VIRTUAL MACHINE SET 143 CONTAINER SET 144

FIG. 1

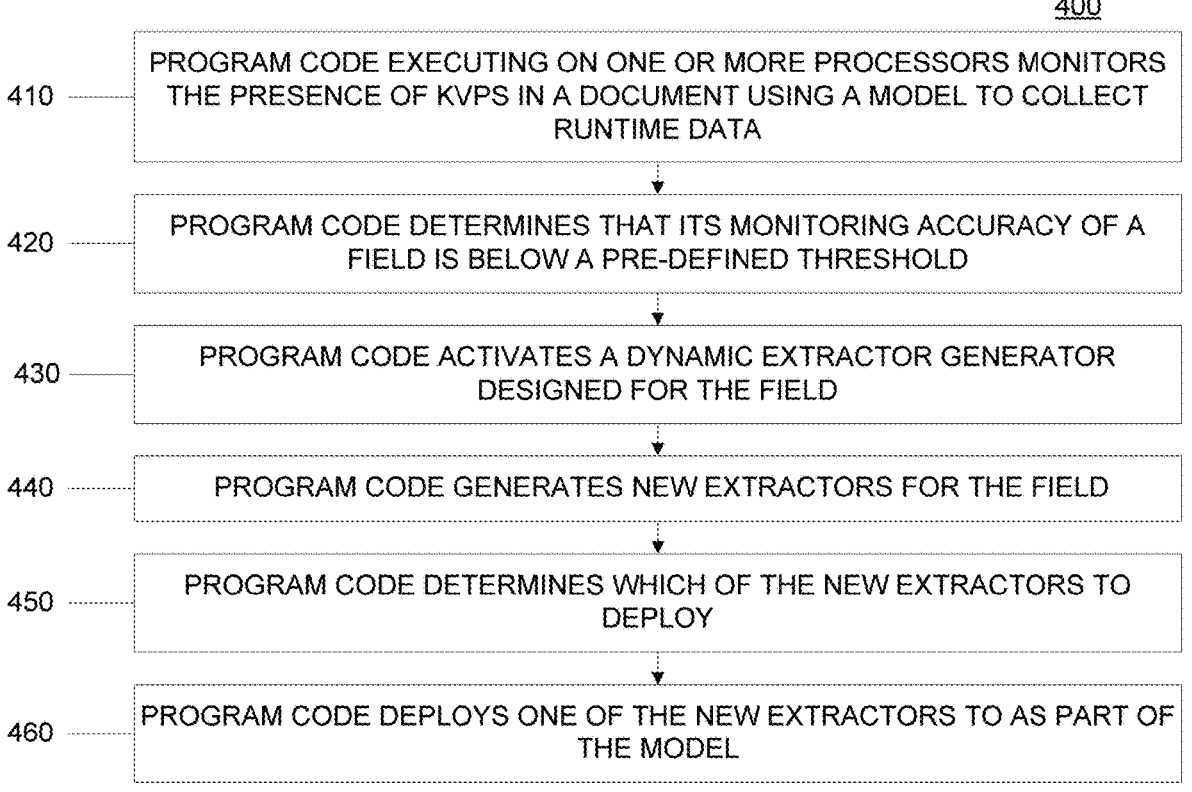

400

410 — PROGRAM CODE EXECUTING ON ONE OR MORE PROCESSORS MONITORS THE PRESENCE OF KVPS IN A DOCUMENT USING A MODEL TO COLLECT RUNTIME DATA

420 — PROGRAM CODE DETERMINES THAT ITS MONITORING ACCURACY OF A FIELD IS BELOW A PRE-DEFINED THRESHOLD

430 — PROGRAM CODE ACTIVATES A DYNAMIC EXTRACTOR GENERATOR DESIGNED FOR THE FIELD

440 — PROGRAM CODE GENERATES NEW EXTRACTORS FOR THE FIELD

450 — PROGRAM CODE DETERMINES WHICH OF THE NEW EXTRACTORS TO DEPLOY

460 — PROGRAM CODE DEPLOYS ONE OF THE NEW EXTRACTORS TO AS PART OF THE MODEL

FIG. 4

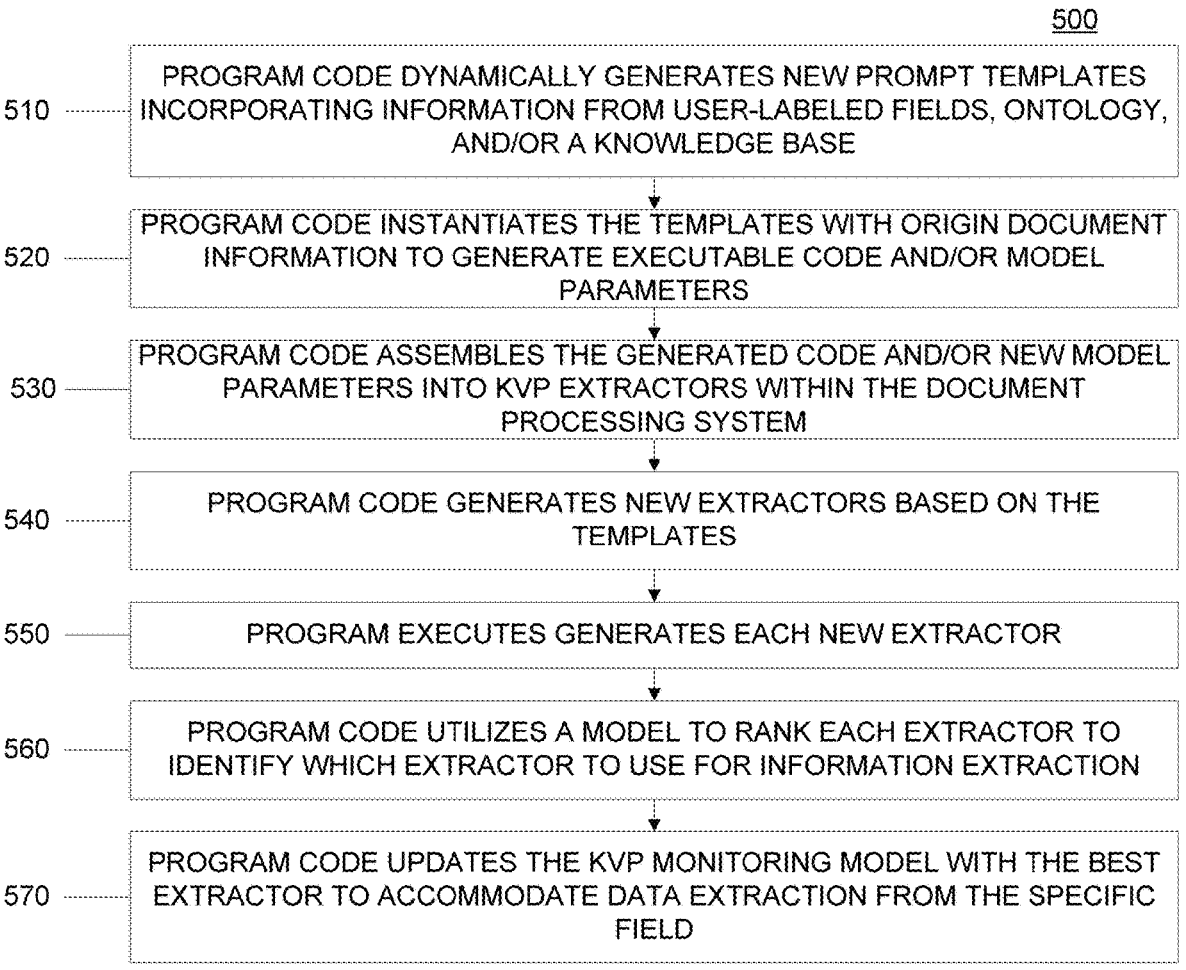

500

510 — PROGRAM CODE DYNAMICALLY GENERATES NEW PROMPT TEMPLATES INCORPORATING INFORMATION FROM USER-LABELED FIELDS, ONTOLOGY, AND/OR A KNOWLEDGE BASE

520 — PROGRAM CODE INSTANTIATES THE TEMPLATES WITH ORIGIN DOCUMENT INFORMATION TO GENERATE EXECUTABLE CODE AND/OR MODEL PARAMETERS

530 — PROGRAM CODE ASSEMBLES THE GENERATED CODE AND/OR NEW MODEL PARAMETERS INTO KVP EXTRACTORS WITHIN THE DOCUMENT PROCESSING SYSTEM

540 — PROGRAM CODE GENERATES NEW EXTRACTORS BASED ON THE TEMPLATES

550 — PROGRAM EXECUTES GENERATES EACH NEW EXTRACTOR

560 — PROGRAM CODE UTILIZES A MODEL TO RANK EACH EXTRACTOR TO IDENTIFY WHICH EXTRACTOR TO USE FOR INFORMATION EXTRACTION

570 — PROGRAM CODE UPDATES THE KVP MONITORING MODEL WITH THE BEST EXTRACTOR TO ACCOMMODATE DATA EXTRACTION FROM THE SPECIFIC FIELD

FIG. 5

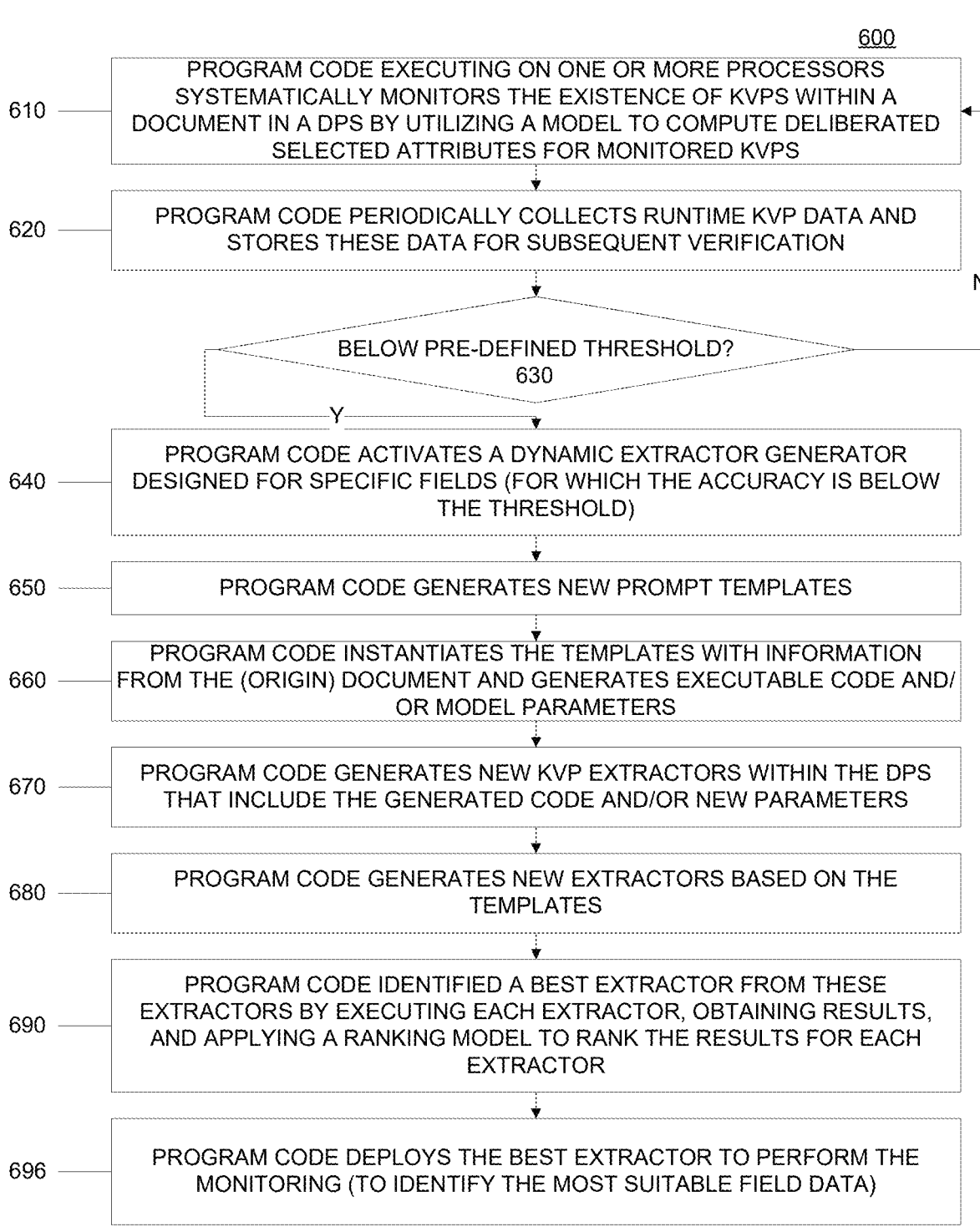

600

610 — PROGRAM CODE EXECUTING ON ONE OR MORE PROCESSORS SYSTEMATICALLY MONITORS THE EXISTENCE OF KVPS WITHIN A DOCUMENT IN A DPS BY UTILIZING A MODEL TO COMPUTE DELIBERATED SELECTED ATTRIBUTES FOR MONITORED KVPS

620 — PROGRAM CODE PERIODICALLY COLLECTS RUNTIME KVP DATA AND STORES THESE DATA FOR SUBSEQUENT VERIFICATION

BELOW PRE-DEFINED THRESHOLD?
630

N

Y

640 — PROGRAM CODE ACTIVATES A DYNAMIC EXTRACTOR GENERATOR DESIGNED FOR SPECIFIC FIELDS (FOR WHICH THE ACCURACY IS BELOW THE THRESHOLD)

650 — PROGRAM CODE GENERATES NEW PROMPT TEMPLATES

660 — PROGRAM CODE INSTANTIATES THE TEMPLATES WITH INFORMATION FROM THE (ORIGIN) DOCUMENT AND GENERATES EXECUTABLE CODE AND/OR MODEL PARAMETERS

670 — PROGRAM CODE GENERATES NEW KVP EXTRACTORS WITHIN THE DPS THAT INCLUDE THE GENERATED CODE AND/OR NEW PARAMETERS

680 — PROGRAM CODE GENERATES NEW EXTRACTORS BASED ON THE TEMPLATES

690 — PROGRAM CODE IDENTIFIED A BEST EXTRACTOR FROM THESE EXTRACTORS BY EXECUTING EACH EXTRACTOR, OBTAINING RESULTS, AND APPLYING A RANKING MODEL TO RANK THE RESULTS FOR EACH EXTRACTOR

696 — PROGRAM CODE DEPLOYS THE BEST EXTRACTOR TO PERFORM THE MONITORING (TO IDENTIFY THE MOST SUITABLE FIELD DATA)

FIG. 6

LOCATION OF KEY VALUE PAIRS

BACKGROUND

The present invention relates generally to the field of data machine learning and in particular, to a method for improving element recognition in electronic files.

A key-value pair (KVP) consists of two related data elements: A key, which is a constant that defines the data set, and a value, which is a variable that belongs to the set. A Document Processing System (DPS), which can also be referred to as a Document Management System (DMS) utilizes various processes to extract key information from documents, including KVPs.

With the development of information technology, more and more documents exist in digital form, such as electronic documents, emails, social media posts, etc. The number of these documents is enormous and constantly growing, requiring effective processing and management. With the rapid growth of information, it has become increasingly difficult for people to search, filter, and obtain relevant information in massive documents. Intelligent document processing provides an automated way to process a large number of documents and extract useful information to improve the efficiency of information acquisition. Intelligent document processing can help extract structured information from documents, discover hidden patterns and trends, and provide strong support for decision-making.

Artificial intelligence (AI) refers to intelligence exhibited by machines. Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

Natural language understanding (NLU) uses deep learning to extract meaning and metadata from unstructured text data. For example, NLU can be used to extract categories, classification, entities, keywords, sentiment, emotion, relations and/or syntax from text. NLU capabilities can be implemented as a machine learning system that can include a neural network (NN). NLU technologies can utilize supervised, semi-supervised, or unsupervised deep learning through a single- or multi-layer NN to classify data. The deep learning capabilities use the NN to identify and weight connections between data points. The use of deep learning, including in NLU, is understood as a form of artificial intelligence. A subset of NLU is natural language processing (NLP). NLP is a subfield of AI and computer science that focuses on the tokenization of data and specifically, the parsing of human language, whether spoken or text, into its elemental pieces.

SUMMARY

Shortcomings of the prior art are overcome, and additional advantages are provided through the provision of a computer-implemented method for extracting key value pair data from fields in a document in a document processing system. The method can include: utilizing, by one or more processors, an extractor, to monitor KVP data in a document; based on the monitoring, determining, by the one or more processors, that accuracy of a field in the document, is below a pre-defined threshold; and dynamically generating, by the one or more processors, based on the determining, a new extractor comprising a KVP extractor to target the field in the document.

Shortcomings of the prior art are overcome, and additional advantages are provided through the provision of a computer program product for extracting key value pair data from fields in a document in a document processing system. The computer program product comprises a storage medium readable by a one or more processors and storing instructions for execution by the one or more processors for performing a method. The method includes, for instance: utilizing, by the one or more processors, an extractor, to monitor KVP data in a document; based on the monitoring, determining, by the one or more processors, that accuracy of a field in the document, is below a pre-defined threshold; and dynamically generating, by the one or more processors, based on the determining, a new extractor comprising a KVP extractor to target the field in the document.

Shortcomings of the prior art are overcome, and additional advantages are provided through the provision of a system for extracting key value pair data from fields in a document in a document processing system. The system includes: a memory, one or more processors in communication with the memory, and program instructions executable by the one or more processors via the memory to perform a method. The method includes, utilizing, by the one or more processors, an extractor, to monitor KVP data in a document; based on the monitoring, determining, by the one or more processors, that accuracy of a field in the document, is below a pre-defined threshold; and dynamically generating, by the one or more processors, based on the determining, a new extractor comprising a KVP extractor to target the field in the document.

Computer systems and computer program products relating to one or more aspects are also described and may be claimed herein. Further, services relating to one or more aspects are also described and may be claimed herein.

Additional aspects of the present disclosure are directed to systems and computer program products configured to perform the methods described above. Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 depicts one example of a computing environment to perform, include and/or use one or more aspects of the present disclosure;

FIG. 4 is a workflow that provides an overview of various aspects performed by the program code (executing on one or more processors) in some embodiments of the present disclosure;

FIG. 5 is a workflow that provides an overview of various aspects performed by the program code (executing on one or more processors) in some embodiments of the present disclosure;

FIG. 6 is a workflow that provides an overview of various aspects performed by the program code (executing on one or more processors) in some embodiments of the present disclosure;

DETAILED DESCRIPTION

The computer-implemented methods, computer program products, and systems described herein orchestrate extraction of desired key information from complex unstructured documents without the need for manual intervention. The examples herein address a known issue of KVP extraction method providing empty results when current approaches are applied to unstructured documents.

Figure 2:
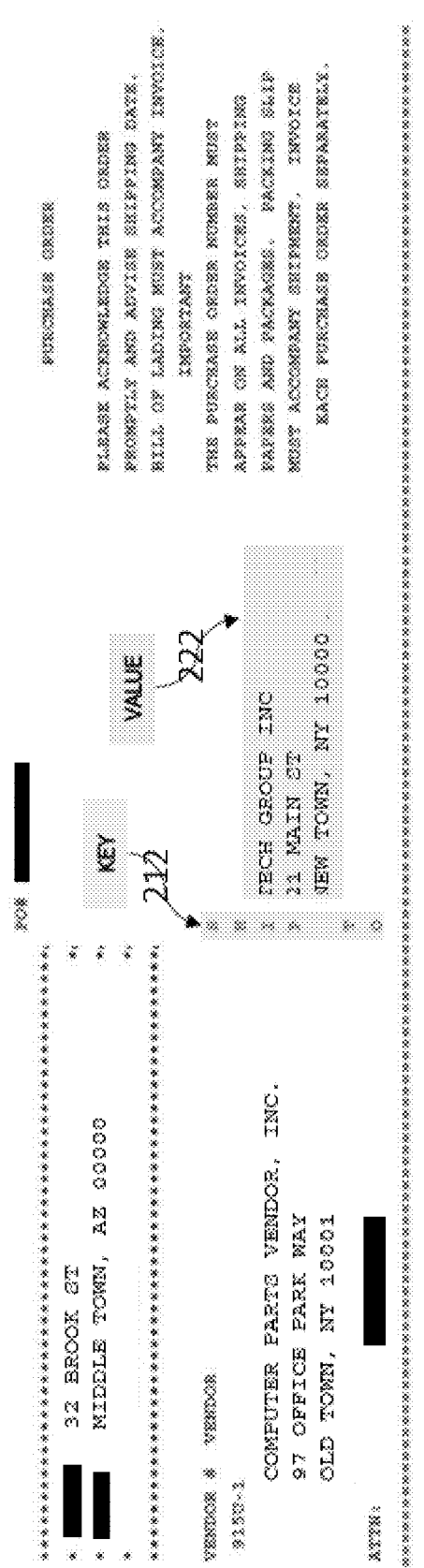
FIG. 2 is an illustration of an issue is a document processing system (DPS) that is addressed by various aspects of the present disclosure.

This known issue of providing empty results occurs because a DPS obtains scanned document images using a simple ASCII-based layout, lacking extensive formatting options. Thus, existing solutions to identify elements in these documents rely on basic ASCII characters like letters, numbers, and symbols for structuring and presenting text. Extracting KVPs from such documents is challenging due to the absence of standardized tags and variations in character spacing and alignment. These differences often result in mixed content situations across different blocks, hindering accurate document analysis and information extraction. An example of a KVP in a given document, in this case, a purchase order 200 related to shipping an item, is the address to which an item is being shipped, the value, and the designation that this address is the ship-to address, the key. FIG. 2, which will be described in greater detail herein, illustrates the key 212 and this value 222 in an invoice scanned into a DPS.

Intelligent document processing increases efficiency and productivity by automating the discovery of information and insights in electronic documents. Methods employed in intelligent document processing include natural language processing (NPL) and natural language understanding (NLU). Intelligent document processing includes certain challenges, including demands to process documents that include different structures, formats, and languages, etc. Processing documents of different types as well as those comprising different elements (text, images, tables, etc.), can also present challenges to existing approaches. Existing intelligent document processing methods that utilize vocabulary and syntactic structure in their analyses can produce results that are not comprehensive, meaning that program code executing these existing approaches may not fully comprehend the content (the meaning) of a document analyzed by these approaches. Rather than rely solely on vocabulary and syntactic structure, the intelligent document processing computer-implemented methods, systems, and computer program products described herein utilize a deeper (more comprehensive) understanding of the semantic information of the document by including program code executing on one or more processors that trains and re-trains one or more machine learning models (referred to herein as extractors), to extracts entity relationships from unstructured documents. Extractors refers to program code executing on one or more processors that extracts key information from a document, for example: an "Invoice Date extractor" can retrieve the date text besides the label "Invoice Date" in a given document.

The methods, systems, and computer program products described herein are directed to a practical application of determining whether key-value pairs (KVP) exist in files (e.g., documents), including monitoring the existence of these KVPs in the files. To make this determination, as described in greater detail herein, program code executing on one or more processors generates a model to compute deliberated selected attributes for monitored KVPs. The examples described herein also include program code identifying and extracting various data based on automated processes. In the examples herein, program code executing on one or more processors: 1) monitors the presence of KVPs in files (e.g., documents, including in a DPM or DMS) and obtains data (e.g., runtime data); and 2) generates a dynamic model comprising extractors to identify missing KVP fields. The program code can generate the dynamic model based on obtaining data during the monitoring. The program code can continually improve the model based on ongoing monitoring.

KVP extraction presents challenges due to the absence of predefined keys. KVP extraction demands a comprehensive retrieval of all pertinent keys and values scattered throughout a document. This task demands an understanding of document structure and content to discern the relationships between different pieces of information, often dealing with hierarchical key-value structures. When presented with diverse documents, to monitor KVPs, an approach would infer and extract a broad spectrum of information without relying on a fixed schema. Hence, in the examples herein, to address the issue of KVP extraction being empty in unstructured documents, program code in the examples herein generates relaxed criteria to address the KVP not being found issue. To this end, the program code generates a prompt that captures the intent of the missing field, to enable a model to provide any relevant information it can find within the document. The prompt acts as a general instruction to search for related details, compensating for the absence of a specific field. For a given document, the program code generates and provides the value fallback prompt based on processing document knowledge. In the examples herein, the program code can utilize large language models (LLMs), including but not limited to ChatGPT, to make predictions for missing KVP data, and to train the prompt, and the program code can utilize a ranking model to train the prompt such that the prompt results in a final accurate key class.

As understood by one of skill in the art, prompt engineering is a process that guides generative AI solutions to generate desired outputs. A prompt process, including an automated prompt process utilized in the examples herein, serves as an intermediary between a machine learning (ML) model and users who query the model. Prompts are a set of inputs that train the models to produce the best and desired outputs back to the user. Prompt engineering structures an instruction that can be interpreted and understood by a generative AI model. For example, a prompt can be a natural language text describing the task that an AI should perform. In these examples, the prompts generated by the program code enable an AI model performing KVP monitoring (as described herein) the extract missing data from fields based on improving data extraction from these fields.

The methods, compute program products, and systems described herein comprise program code executing on one or more processors which monitor the presence of KVPs in documents and to monitor at a consistent (e.g., pre-defined) level of accuracy, the program code generates extractors (e.g., models) to address missing field data (e.g., when monitoring of KVPs in specific field does not meet the accuracy threshold). In the examples, herein, program code monitors the presence of KVPs in documents by applying the most recent version of a self-learning model and collecting runtime data, including periodically (e.g., at pre-defined intervals and/or based on pre-defined actions occurring within the system). As will be discussed in greater detail herein, program code collects and stores KVP data from files. The program code stores these data for use in subsequent verifications. Hence, these data are training data for the model generated and applied by the program code and utilized to monitor KVPs. Program code in many of the examples herein evaluates accuracy of the monitoring and if the program code determined that a field falls below a defined threshold, the program code activates a dynamic extractor generator to address the issue identified by the program code (e.g., an extractor designed for a specific one or more fields).

The methods, computer program products, and systems described herein comprise program code executing on one or more processors which generate new extractors for missing field (e.g., KVP) data. The program code dynamically generates new prompt templates, incorporating information from user-labeled fields, ontology, and/or a knowledge base. The program code instantiates each template with original document information to generate executable code and/or model parameters. The program code assembles the generated code or new parameters into new KVP extractors for use within a document processing system. As aforementioned an "Invoice Date extractor" can retrieve the date text besides the label "Invoice Date". The program code can generate multiple new extractors based on templates. The program code executed each extractor and ranks the results utilizing a ranking model to identify a best extractor to use for information extraction.

The examples described herein are inextricably tied to computing and are directed to a practical application. The examples herein address an issue that is inextricably tied to computing with an approach that utilizes aspects that are inextricably tied to computing. A practical application addressed by the program code is compensating for the absence of KVPs in documents. The presence of KVPs or being able to find KVPs in documents or other files fosters speedy and scalable storage, enabling flexibility. Flexibility is a valuable trait because handling data often involves change and adaptation. Being able to store data in KVPs enables storage of large amounts of data and efficient retrieval of these data. The examples herein utilize prompt learning to generate relaxed criteria to address the KVP not found issue. The program code in the examples herein utilizes prompt engineering to generate data type specific prompt templates based on document data. Prompt engineering and the use of LLMs are technologies that are inextricably tied to computing. Thus, the examples herein utilize approaches that are inextricably tied to computing to improve, among other things, data storage and retrieval efficiency and flexibility, which is a practical application within computing.

The examples herein are also inextricably tied to computing based on utilizing machine learning to continuously update and refine models to improve accuracy and efficiency. In these examples, the program code utilizes prompt engineering as well as a ranking model. The examples herein can develop and train machine learning models including LLMs, with underlying recurrent neural networks (RNNs) and/or convolutional neural network (CNNs), to generate prompts to achieve downstream tasks without the need for fine-tuning. Hence, the examples herein can achieve fitting of downstream tasks without additional training conditions. As will be discussed in greater detail herein, in these examples, when the program code constructs text data, the representation of the language itself is limited, as there are a certain range of text/words that are not available in general models in other fields. Current large models have strong representation capabilities, and even through reverse task reconstruction such as prompt, the models can still achieve good results. The program code can also utilize a (e.g., big data) model to generate the optimal answers for generating prompt. In an optimal key class set, the program code trains a ranking model to the final key class, so the program code redefines the downstream tasks so that they can use the ability of the pre training language model to adapt the language model. The program code continuously updates and refines these models to improve accuracy and efficiency.

LLMs are deep learning models that are pre-trained on vast amounts of data. The underlying transformer is a set of neural networks that consist of an encoder and a decoder with self-attention capabilities. The encoder and decoder extract meanings from a sequence of text and understand the relationships between words and phrases in it. Transformer LLMs are capable of unsupervised training and can learn to understand basic grammar, languages, and knowledge. Unlike earlier recurrent neural networks (RNN) that sequentially process inputs, transformers process entire sequences in parallel. This allows the data scientists to use GPUs for training transformer based LLMs, significantly reducing the training time.

Neural networks, which are utilized in certain of the examples herein, refer to a biologically inspired programming paradigm which enables a computer to learn from observational data. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network of the technical environment. Modern neural networks are non-linear statistical data modeling tools. They are usually used to model complex relationships between inputs and outputs or to identify patterns in data (i.e., neural networks are non-linear statistical data modeling or decision-making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in image recognition, speech recognition, and natural language processing. Neural networks can model complex relationships between inputs and outputs to identify patterns in data, including in images, for classification. In the examples herein, the program code can utilize CNNs and/or RNNs to generate a prompt in order to predict missing values in a KVP in a document.

In certain embodiments of the present invention the program code utilizes a CNN. CNNs are so named because they utilize convolutional layers that apply a convolution operation (a mathematical operation on two functions to produce a third function that expresses how the shape of one is modified by the other) to the input, passing the result to the next layer. The convolution emulates the response of an individual neuron to visual stimuli. Each convolutional neuron processes data only for its receptive field. It is generally not practical to utilize general (i.e., fully connected feedforward) neural networks to process data rich objects, as very high number of neurons would be necessary, due to the very large input sizes associated with larger files. Utilizing a CNN addresses this issue as it reduces the number of free parameters, allowing the network to be deeper with fewer parameters, as regardless of the file size, the CNN can utilize a consistent number of learnable parameters because CNNs fine-tune large amounts of parameters and massive pre-labeled datasets to support a learning process. CNNs resolve the vanishing or exploding gradients problem in training traditional multi-layer neural networks, with many layers, by using backpropagation. Thus, CNNs can be utilized in large-scale recognition systems, giving state-of-the-art results in segmentation, object detection, and object retrieval.

In certain embodiments of the present invention the program code utilizes an RNN. An RNN is a class of NN where connections between units form a directed cycle in order to exhibit dynamic temporal behavior. Unlike feed-forward NNs, RNNs can use their internal memory to process arbitrary sequences of inputs. For this reason, current applications of RNNs include unsegmented data recognition, connected handwriting recognition, and speech recognition. These types of insights are useful in predicting missing KVP data.

An LLM is a deep learning model, and a deep learning model can refer to a type of classifier. The program code can implement a deep learning model in various forms such as by a neural network (e.g., a CNN, an RNN); LLMs are generally implemented using an NN. In some examples, a deep learning mode includes multiple layers, each layer comprising multiple processing nodes. In some examples, the layers process in sequence, with nodes of layers closer to the model input layer processing before nodes of layers closer to the model output. Thus, layers feed to the next. Interior nodes are often "hidden" in the sense that their input and output values are not visible outside the model. In these examples, the program code can utilize NNs to classify users into clusters dynamically based on document content.

In addition to being inextricably tied to computing and being directed to a practical application, the examples herein provide significantly more than existing approaches to monitoring KVPs in documents and addressing missing values. Unlike existing approaches, the examples herein include program code executing on one or more processors which monitors the presence of KVPs in a document using a new model and collects runtime data periodically. Additionally, existing approaches do not dynamically generate prompt templates to create extractors for missing fields. Also, existing approaches do not rank extractors and deploy one perceived to be most effective to address the missing fields issue, moving forward. Rather, existing approaches rely on ASCII character set elements, such as letters, numbers, and symbols, for document structuring and presentation. With these approaches, extracting KVPs poses challenge due to the absence of standardized tags or markers, as based on the text orientation, location, alignment, spacing, etc., labels vary in different documents, which complicates extracting key information. The varying spacing and alignment often lead to mixed content situations across different blocks, creating obstacles for accurate document analysis and information extraction.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as a code block for monitoring KVPs and generating models to extract missing values 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, EUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 3:
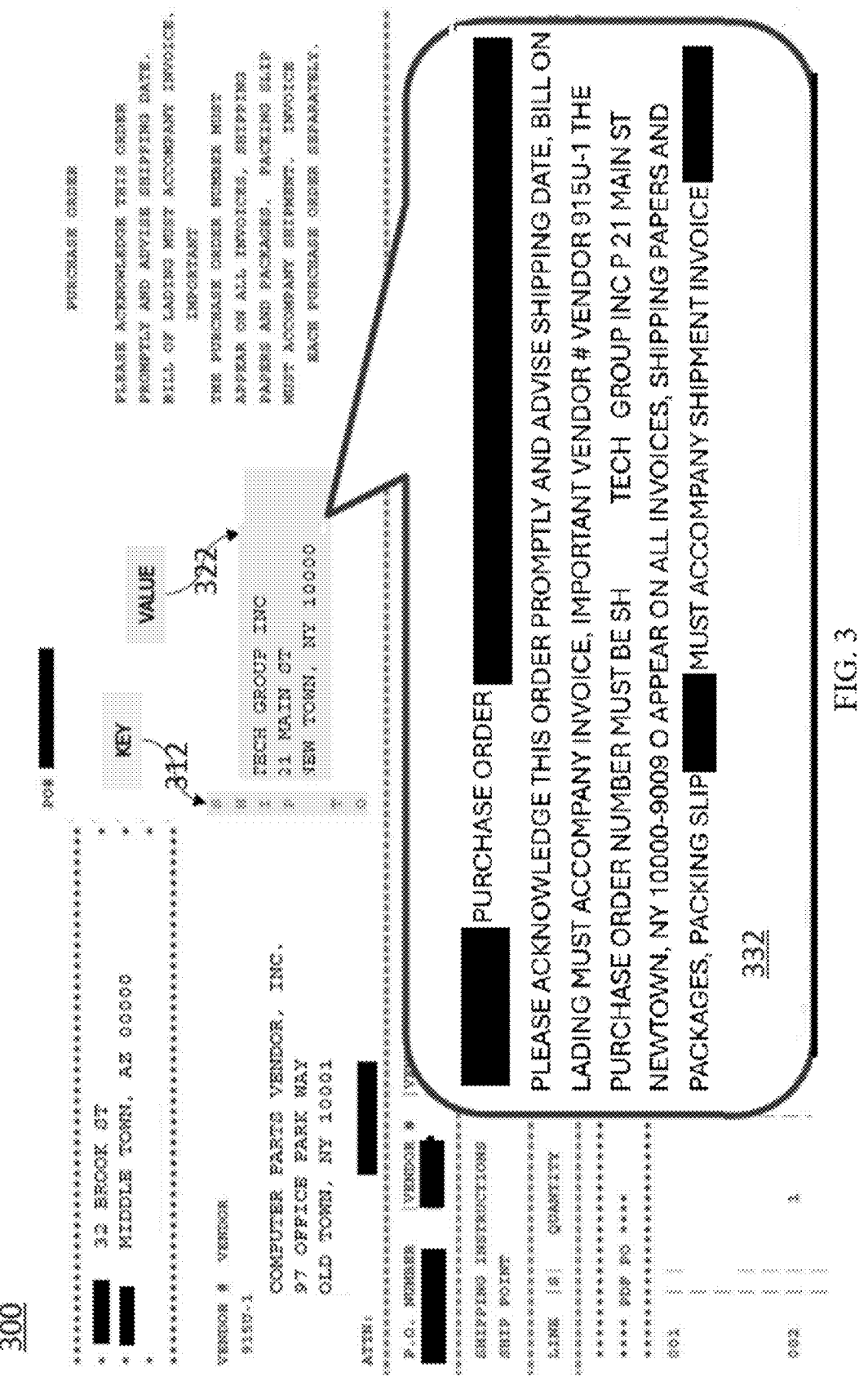
FIG. 3 is an illustration of an issue is a document processing system (DPS) that is addressed by various aspects of the present disclosure.

FIG. 2, discussed above, is an example of a purchase order 200 scanned into a DPS from which processes within the DPS attempt to extract a KVP, in this case, a ship-to address tag (key 212) and the shipping address itself (value 222). As aforementioned, a DPS handles scanned document images using a simple ASCII-based layout, lacking extensive formatting options. This layout relies on basic ASCII characters like letters, numbers, and symbols for structuring and presenting text. FIG. 3 illustrates, using the same purchase order 300 (e.g., FIG. 2, 200), the challenge in extracting KVPs from documents due to the absence of standardized tags and variations in character spacing and alignment, which can result in mixed content situations across different blocks, hindering accurate document analysis and information extraction. FIG. 3 illustrates how the extracted text 332, because of the unique layout of the purchase order 300 and the lack of clarity regarding a "ship-to" value, would include an empty KVP. Specifically, because of the unique formatting of this scanned purchase order, an existing process in the DPS extracts the text "S H TECH GROUP P INC P 21 MAIN ST NEW TOWN NY 10000-9009" instead of a key of "SHIP TO" and a value of "TECH GROUP INC. 21 MAIN ST NEW TOWN NY 10000-9009."

FIG. 3 illustrates how existing extractors within a DPS are unable to locate desired text (the KVP is empty). As will be discussed in greater details in FIGS. 4-6, the examples herein integrate automatically defined (e.g., system defined via machine learning) templates the original text to locate the desired information and automatically generate related code. The revised codes become candidate extractors for the present examples and the program code assembles the code into information extractors in the DPS. In some examples, the program code generates multiple extractors to address a specific missing KVP value (e.g., specific fields), evaluates and ranks the multiple extractors, and integrates the best performing extractor to address the specific deficiency into the DPS. In FIG. 3, the specific deficiency addressed by the examples herein would be locating a ship-to tag and the respective address in view of the formatting of the purchase order 300.

In some examples herein, the templates defined by the program code are Python templates. This example is provided for illustrative purposes only and not to suggest and/or impose any limitations. A Python template is a class of String module which allows for data to change without having to edit the application. It can be modified with subclasses.

FIG. 4 is a workflow 400 that illustrates various aspects of some examples herein. FIG. 4 provides a general overview of certain parts of the examples described herein. As illustrated in FIG. 4, program code executing on one or more processors monitors the presence of KVPs in a document using a model to collect runtime data (e.g., periodically) (410). In some examples, as part of the monitoring the program code compute selected attributes for monitored KVPs. The program code can store the collects runtime KVP data for subsequent verifications. The program code determines that its monitoring accuracy of a field is below a pre-defined threshold (420). Based on determining that the accuracy of the field is below the pre-defined threshold, the program code activates a dynamic extractor generator designed for the field (430). The program code generates new extractors for the field (440). The program code determines which of the new extractors to deploy (450). The program code deploys one of the new extractors to as part of the model (460). In some examples, the program code retains the new extractor in a knowledge base. The program code can retain all historical extractors in this knowledge base as well as extractors that are part of the present model for monitoring documents and extracting KVPs.

FIG. 5 is a workflow 500 that provides additional details about the program code generating extractors (e.g., FIG. 4, 440). The workflow 500 illustrates hoe program code executing on one or more processors in the examples here dynamically generates KVP extractors for missing KVP data. The extractors generate are specific to fields in which the program code determined that there is missing KVP data. As aforementioned this workflow 500 is triggered by an event in the monitoring. Specifically, program code executing on one or more processors determined that the accuracy of a field is below the pre-defined threshold and thus, activates this dynamic extractor generator designed for the field. Based on this event, the program code dynamically generates new prompt templates (e.g., multiple templates), incorporating information from user-labeled fields, ontology, and/or a knowledge base (510). The knowledge base can include data that is retained by the program code during the monitoring. Thus, the program code builds the knowledge base progressively over time. The program code can utilize the knowledge based to store all system-defined templates for information extraction. The program code instantiates (e.g., represented as or by an instance) the templates with original document information to generate executable code and/or model parameters (520). The program code assembles the generated code and/or new model parameters into KVP extractors within the document processing system (530). The program code generates new extractors based on the templates (540). The program code executes each new extractor (550). Program code utilizes a model to rank each extractor to identify which extractor to use for information extraction (560). The program code can train, evaluate, and deploy the model utilized to rank the extractors. The ranking model identifies the most suitable field data and hence, selects the best extractor. The program code updates the KVP monitoring model with the best extractor to accommodate data extraction from the specific field (570). The program code can propose recommendations to the end user based on the results of the ranking model.

Below is an example of an original text that can be analyzed and from which KVPs can be extracted utilizing the examples here:

abcd_xyz_1234

A user or process desires to information "xyz" from the original text "abcd_xyz_1234." In this scenario, an existing model (comprised on extractors) cannot locate this text. This the program code utilizes the workflow 700 of FIG. 7 to locate the desired information and generate related code. The program code in some examples can generate the code and locate the text simultaneously. Once the program code generates code that when executed, successfully locates the desired information, the program code replaces the desired "xyz" in the generated code with a dirty token. This revised code becomes a candidate extractor (as aforementioned, the program code generates more than one potential extractor for a given field) and the program code can assemble it into the information extractor. The program code can store all system-defined templates for information extraction in the knowledge base.

By integrating the examples herein into a DPS or DMS, the program code can facilitate precise extraction of KVPs from files (e.g., scanned documents), including but not limited to, ASCII-based documents. Users stand to gain significantly from this advancement, as it enhances the accuracy of document extraction. Program code in the examples herein also boosts overall productivity in automated document processing, diminishing reliance on manual labor. As discussed herein, the examples described integrate KVP and LLM technologies to addresses the time-consuming nature of the core LLM enrichment process and to achieve a harmonious balance in computational resource utilization.

The templates generated by the program code in the examples herein can be understood as prompt templates. The examples utilize prompt engineering to generate some data type specific prompt templates. Utilizing prompts in large LLMs fits LLMs into downstream tasks without the need for fine-tuning and without additional training conditions. In some examples herein, the training conditions of the LLM utilized to generate the templates and extractors are limited. In some of these examples, when the program code constructs text data, the program code limits the representation of the language itself. There is a certain range of text/words that are not available in general models in other fields. The current large models have strong representation capabilities, and even through reverse task reconstruction such as prompt, they can still achieve good results. Big data models can be used to generate an optimal answer for generating prompt. In the optimal key class set, the program code trains a ranking model to the identify/construct a final key class, so the whole process can redefine the downstream tasks. The program code redefines the downstream tasks to utilize the ability of the pre training language model to adapt the language model.

FIG. 6 is a workflow 600 that illustrates three aspects in addressing the empty KVP issue and automatically improving document processing to address this issue. In the examples herein, the program code: 1) monitors KVPs in a document utilizing a KVP extractor; 2) dynamically generates a new extractor that includes one or more new extractors specifically for missing field (KVP) data; and 3) utilizes a ranking model to identify the most suitable field data to determine which of the one or more extractors should be utilized to modify the extractor. Once the extractor is modified, the program code can continue the monitoring with the newest version of this model. As illustrated in the workflow 600, program code executing on one or more processors systematically monitors the existence of KVPs within a document in a DPS by utilizing a model to compute deliberated selected attributes for monitored KVPs (610). During the monitoring, the program code periodically (e.g., at pre-defined intervals) collects runtime KVP data and stores these data for subsequent verification (620). Accessing the stored data, the program code determines if accuracy of a field in the document has fallen below a defined threshold (630). Based on determining that the field accuracy is below a given threshold, the program code activates a dynamic extractor generator designed for specific fields (for which the accuracy is below the threshold) (640). Based on being activated, based on user-labeled fields, ontology, and/or a knowledge base, program code generates new prompt templates (650). The program code instantiates the templates with information from the (original) document and generates executable code and/or model parameters (660). The program code generates new KVP extractors for use within the DPS that include the generated code and/or new parameters (670). The program code generates new extractors based on the templates (680). The program code identified a best extractor from these extractors by executing each extractor, obtaining results, and applying a ranking model to rank the results for each extractor (690). The program code deploys the best extractor to perform the monitoring (to identify the most suitable field data) (696). In some examples, the program code can generate recommendations and provide these recommendations to a user via a graphical user interface and thus, involve the user in ranking the results and tuning the ranking model. The program code can refine the ranking model based on feedback obtained from the user.

Figure 7:
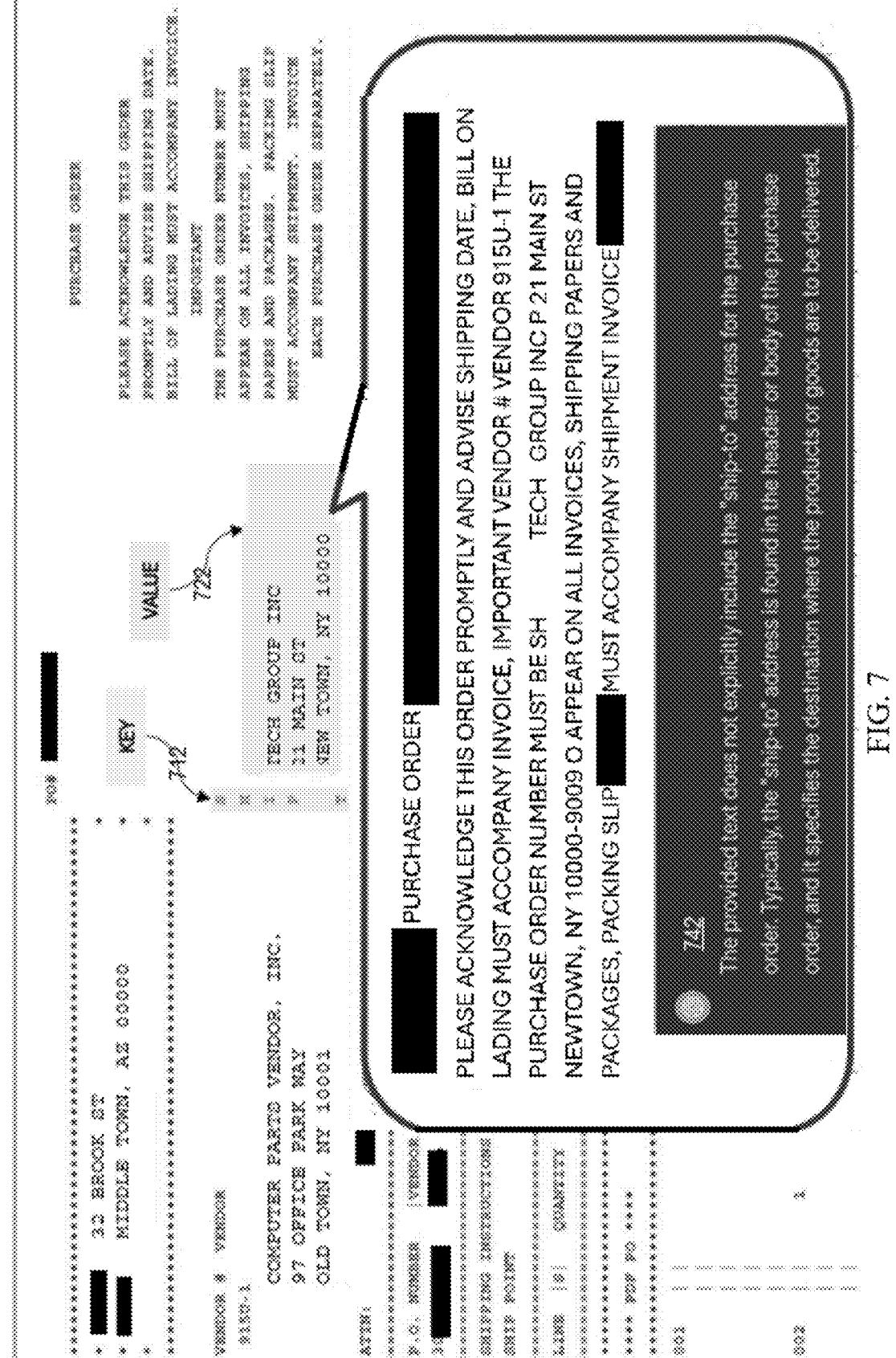
FIG. 7 is an illustration of an integration of a DPS with a large language model (LLM), which is an aspect of some embodiments of the present disclosure.

As discussed, including in reference to FIGS. 4-6, program code in some of the examples herein trains and utilizes LLMs (including but not limited to ChatGPT) to generate prompts that enable extraction of missing KVP data and also trains and utilizes a ranking model to determine which extractor is best to integrate into a monitoring process for KVPs in a DPS. FIG. 7, which is inclusive of workflow elements in FIGS. 4-6, illustrates an integration of the processes in the DPS with an LLM (e.g., ChatGPT), to utilize this AI process to recognize that the extractor is not extracting a given KVP (e.g., 712, 722) in the extracted text. In this examples, an LLM prompts 742 a user/service/application when the extractor cannot identify a KVP (e.g., 712, 722) in the extracted text 732 because of unexpected formatting on the document 700. The program code can, in examples herein, utilize an LLM (or ChatGPT) and an underlying NN (e.g., or CNN and/or an RNN) to determine criteria for a prompt template. The program code utilizes the prompt templates to generate extractors based on user-labeled fields, ontology, and/or a knowledge base.

Figure 8:
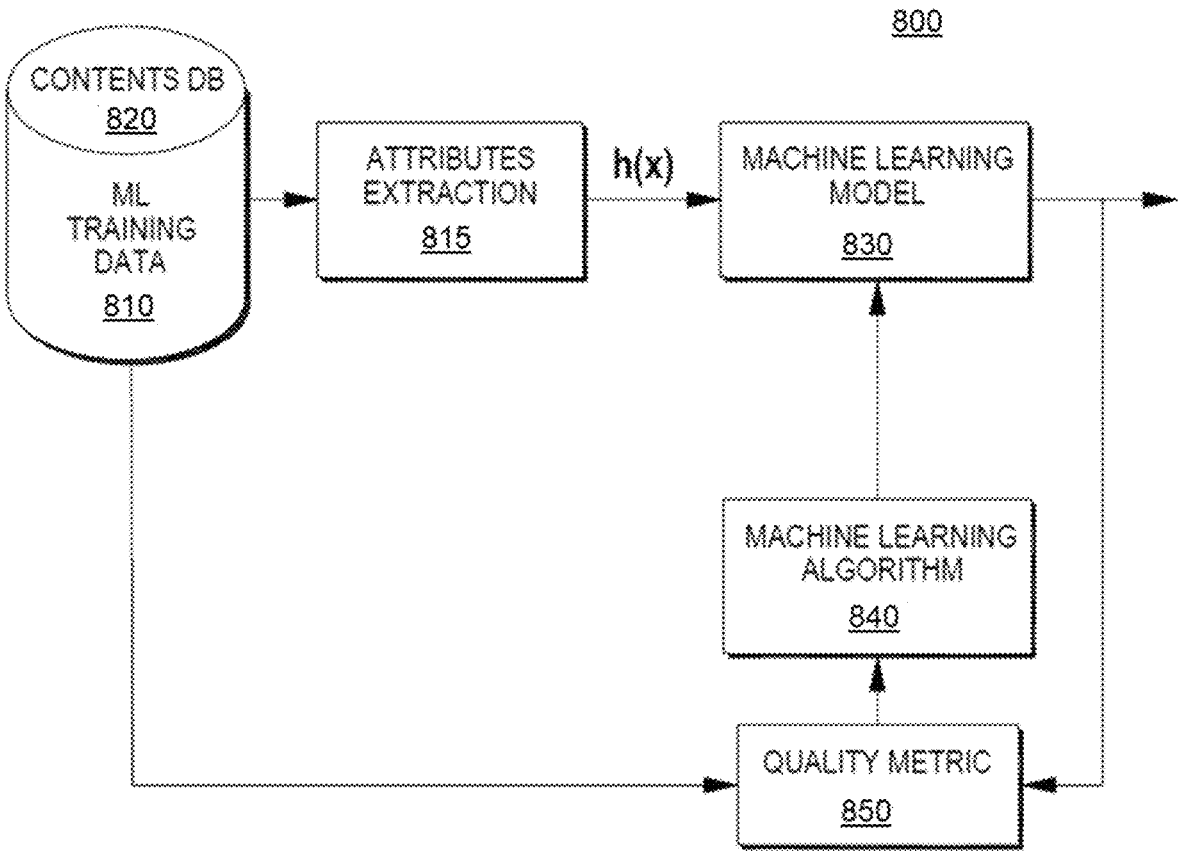
FIG. 8 is one example of a machine learning training system that can be utilized to perform various aspects performed by the program code (executing on one or more processors) in some embodiments of the present disclosure.

FIG. 8 is one example of a machine learning training system 800 that can be utilized, in one or more aspects, to perform cognitive analyses of various inputs, including user-labeled fields, ontology, and/or a knowledge base to generate prompt templates to address missing KVP data in specific fields and/or to select a best extractor for KVP extraction. Machine learning (ML) solves problems that are not solved with numerical means alone. In this ML-based example, program code extracts various attributes (815) from data stored by the program code during the monitoring as well as user-labeled fields, ontology, and/or the knowledge base (which includes past templates and/or extractors). The program code can utilize these attributes to develop a predictor function, h (x), also referred to as a hypothesis, which the program code utilizes as a machine learning model 830, in this case, to provide a prompt template and/or to rank extractor results. The program code can identify various attributes and/or parameters in the ML training data 810, which can be stored in one or more contents database 820 (e.g., in a knowledge base), the program code can utilize various techniques to identify attributes in an embodiment of the present invention. Embodiments of the present invention utilize varying techniques to select attributes (elements, patterns, features, components, etc.), including but not limited to, diffusion mapping, principal component analysis, recursive feature elimination (a brute force approach to selecting attributes), and/or a Random Forest, to select the attributes related to various users and user activities. The program code can utilize a machine learning algorithm 840 to train the machine learning model 830 (e.g., the algorithms utilized by the program code), including providing weights for the conclusions, so that the program code can train the predictor functions that comprise the machine learning model 830 to generate prompts and/or to weight various extractors. The conclusions can be evaluated by a quality metric 850. By selecting a diverse set of ML training data 810, the program code trains the machine learning model 830 to identify and weight various attributes (e.g., features, patterns, components).

The examples herein include computer-implemented methods, computer program products, and computer systems for obtaining missing key value pair (KVP) data from a document. In some examples herein, program code executing on one or more processors utilizing an extractor to monitor KVP data in a document. Based on the monitoring, the program code determines that accuracy of a field in the document is below a pre-defined threshold. The program code dynamically generates, based on the determining, a new extractor comprising a KVP extractor to target the field in the document.

In some examples, the program code monitors the KVP data in the document based in utilizing the new extractor.

In some examples, the program code utilizing the extractor to monitor the KVP data in the document comprises: the program code monitoring existence of KVPs within the document by utilizing a model to compute deliberated selected attributes for the monitored KVPs, collecting the KVP data, storing the KVP data for subsequent verification (the subsequent verification comprises evaluating accuracy of the field in the document), and accessing the stored KVP data to determine if the accuracy of the field in the document is below the pre-defined threshold.

In some examples, the program the collected KVP data comprises runtime KVP data.

In some examples, the program code monitoring is periodic at pre-defined intervals.

In some examples, the program code dynamically generating the new KVP extractors of the new extractor comprises: based on determining that the accuracy of the field in the document is below the pre-defined threshold, the program code activates the dynamic generation of the new extractor.

In some examples, the program code, based on the activating, utilizes aspects selected from the group consisting of: user-labeled fields, ontology, and a knowledge base, to generate new templates. The program code instantiates the templates with information from the document to generates one or more objects. The program code generates multiple KVP extractors. The new KVP extractors comprise the objects and the KVP extractor to target the field in the document in the new extractor is one of the KVP extractors.

In some examples, the one or more objects are selected from the group consisting of: executable code and model parameters.

In some examples, the program code the templates comprise prompt templates.

In some examples, the program code generating the new prompt templates comprises the program code applying a large language model to predict one or more prompts for the field.

In some examples, the program code dynamically generating the new extractor comprising the KVP extractor to target the field in the document, further comprises: the program code executing each of the multiple KVP extractors, and the program code applying a ranking model to rank results of the executing for each KVP extractor of the multiple KVP extractors to identify a best KVP extractor for the field in the document, wherein the KVP extractor us the best KVP extractors for the field in the document.

In some examples, the program code applying the ranking model comprises: the program code providing the results of the executing, via a graphical interface, to a user, and the program code obtaining, via the graphical user interface, feedback related to ranking of the results by the ranking model, and the program code automatically modifying the ranking model based on the feedback.

Although various embodiments are described above, these are only examples. For example, reference architectures of many disciplines may be considered, as well as other knowledge-based types of code repositories, etc., may be considered. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for obtaining missing key value pair (KVP) data from a document, comprising:

utilizing, by one or more processors, an extractor, to monitor KVP data in a document;

based on the monitoring, determining, by the one or more processors, that accuracy of a field in the document, is below a pre-defined threshold; and dynamically generating, by the one or more processors, based on the determining, a new extractor comprising a KVP extractor to target the field in the document, comprising:

based on determining that the accuracy of the field in the document is below the pre-defined threshold, activating, by the one or more processors, the dynamic generation of the new extractor, wherein the dynamically generating comprises designing the new extractor for the field for which the accuracy is below the pre-defined threshold.

2. The computer-implemented method of claim 1, further comprising:

monitoring, by the one or more processors, the KVP data in the document based in utilizing the new extractor.

3. The computer-implemented method of claim 1, wherein the utilizing the extractor to monitor the KVP data in the document comprises:

monitoring, by the one or more processors, existence of KVPs within the document, wherein by utilizing a model to compute deliberated selected attributes for the monitored KVPs;

collecting, by the one or more processors, the KVP data;

storing, by the one or more processors, the KVP data for subsequent verification, wherein the subsequent verification comprises evaluating accuracy of the field in the document; and accessing, by the one or more processors, the stored KVP data to determine if the accuracy of the field in the document, is below the pre-defined threshold.

4. The computer-implemented method of claim 3, wherein the collected KVP data comprises runtime KVP data.

5. The computer-implemented method of claim 3, wherein the monitoring is periodic at pre-defined intervals.

6. The computer-implemented method of claim 1, further comprising:

based on the activating, utilizing, by the one or more processors, aspects selected from the group consisting of: user-labeled fields, ontology, and a knowledge base, to generate new templates;

instantiating, by the one or more processors, the templates with information from the document to generates one or more objects; and generating, by the one or more processors multiple KVP extractors, wherein the new KVP extractors comprise the objects, wherein the KVP extractor to target the field in the document in the new extractor is one of the KVP extractors.

7. The computer-implemented method of claim 6, wherein the one or more objects are selected from the group consisting of: executable code and model parameters.

8. The computer-implemented method of claim 6, wherein the templates comprise prompt templates.

9. The computer-implemented method of claim 6, wherein generating the new prompt templates comprises applying a large language model to predict one or more prompts for the field.

10. The computer-implemented method of claim 6, wherein dynamically generating the new extractor comprising the KVP extractor to target the field in the document, further comprises:

executing, by the one or more processors, each of the multiple KVP extractors; and applying, by the one or more processors, a ranking model to rank results of the executing for each KVP extractor of the multiple KVP extractors to identify a best KVP extractor for the field in the document, wherein the KVP extractor us the best KVP extractors for the field in the document.

11. The computer-implemented method of claim 10, wherein applying the ranking model comprises:

providing, by the one or more processors, the results of the executing, via a graphical interface, to a user;

obtaining, by the one or more processors, via the graphical user interface, feedback related to ranking of the results by the ranking model; and automatically modifying, by the one or more processors, the ranking model based on the feedback.

12. A computer system for obtaining missing key value pair (KVP) data from a document, the computer system comprising:

a memory; and one or more processors in communication with the memory, wherein the computer system is configured to perform a method, said method comprising:

utilizing, by the one or more processors, an extractor, to monitor KVP data in a document;

based on the monitoring, determining, by the one or more processors, that accuracy of a field in the document, is below a pre-defined threshold; and dynamically generating, by the one or more processors, based on the determining, a new extractor comprising a KVP extractor to target the field in the document, comprising:

based on determining that the accuracy of the field in the document is below the pre-defined threshold, activating, by the one or more processors, the dynamic generation of the new extractor, wherein the dynamically generating comprises designing the new extractor for the field for which the accuracy is below the pre-defined threshold.

13. The system of claim 12, the method further comprising:

monitoring, by the one or more processors, the KVP data in the document based in utilizing the new extractor.

14. The system of claim 12, wherein the utilizing the extractor to monitor the KVP data in the document comprises:

monitoring, by the one or more processors, existence of KVPs within the document, wherein by utilizing a model to compute deliberated selected attributes for the monitored KVPs;

collecting, by the one or more processors, the KVP data;

storing, by the one or more processors, the KVP data for subsequent verification, wherein the subsequent verification comprises evaluating accuracy of the field in the document; and accessing, by the one or more processors, the stored KVP data to determine if the accuracy of the field in the document, is below the pre-defined threshold.

15. The system of claim 14, wherein the collected KVP data comprises runtime KVP data.

16. The system of claim 14, wherein the monitoring is periodic at pre-defined intervals.

17. The system of claim 12, the method further comprising:

based on the activating, utilizing, by the one or more processors, aspects selected from the group consisting of: user-labeled fields, ontology, and a knowledge base, to generate new templates;

instantiating, by the one or more processors, the templates with information from the document to generates one or more objects; and generating, by the one or more processors multiple KVP extractors, wherein the new KVP extractors comprise the objects, wherein the KVP extractor to target the field in the document in the new extractor is one of the KVP extractors.

18. A computer program product for obtaining missing key value pair (KVP) data from a document, the computer system comprising:

one or more computer readable storage media and program instructions collectively stored on the one or more computer readable storage media readable by at least one processing circuit to:

utilize an extractor to monitor KVP data in a document;

based on the monitoring, determine that accuracy of a field in the document, is below a pre-defined threshold; and dynamically generate a new extractor comprising a KVP extractor to target the field in the document, comprising:

based on determining that the accuracy of the field in the document is below the pre-defined threshold, activate the dynamic generation of the new extractor, wherein the dynamically generating comprises designing the new extractor for the field for which the accuracy is below the pre-defined threshold.

* * * * *